UNITED STATES PATENT OFFICE.

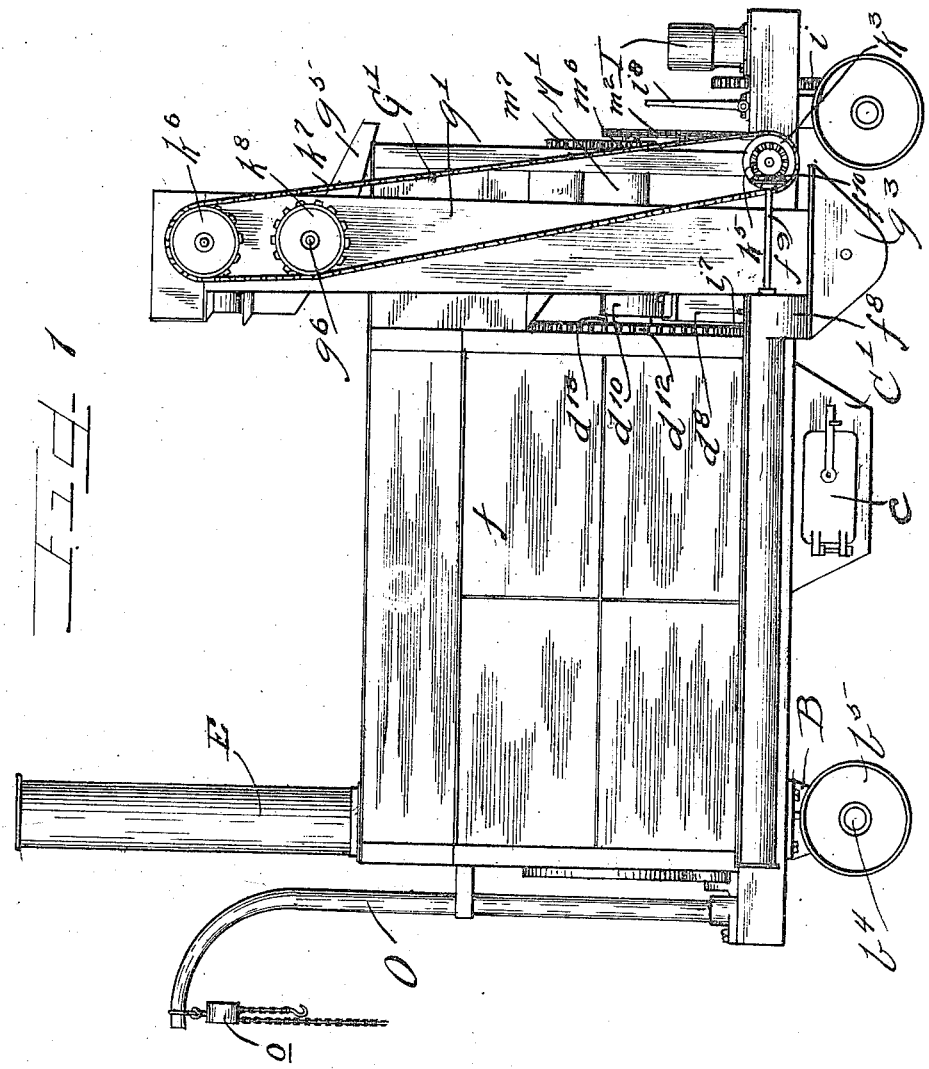

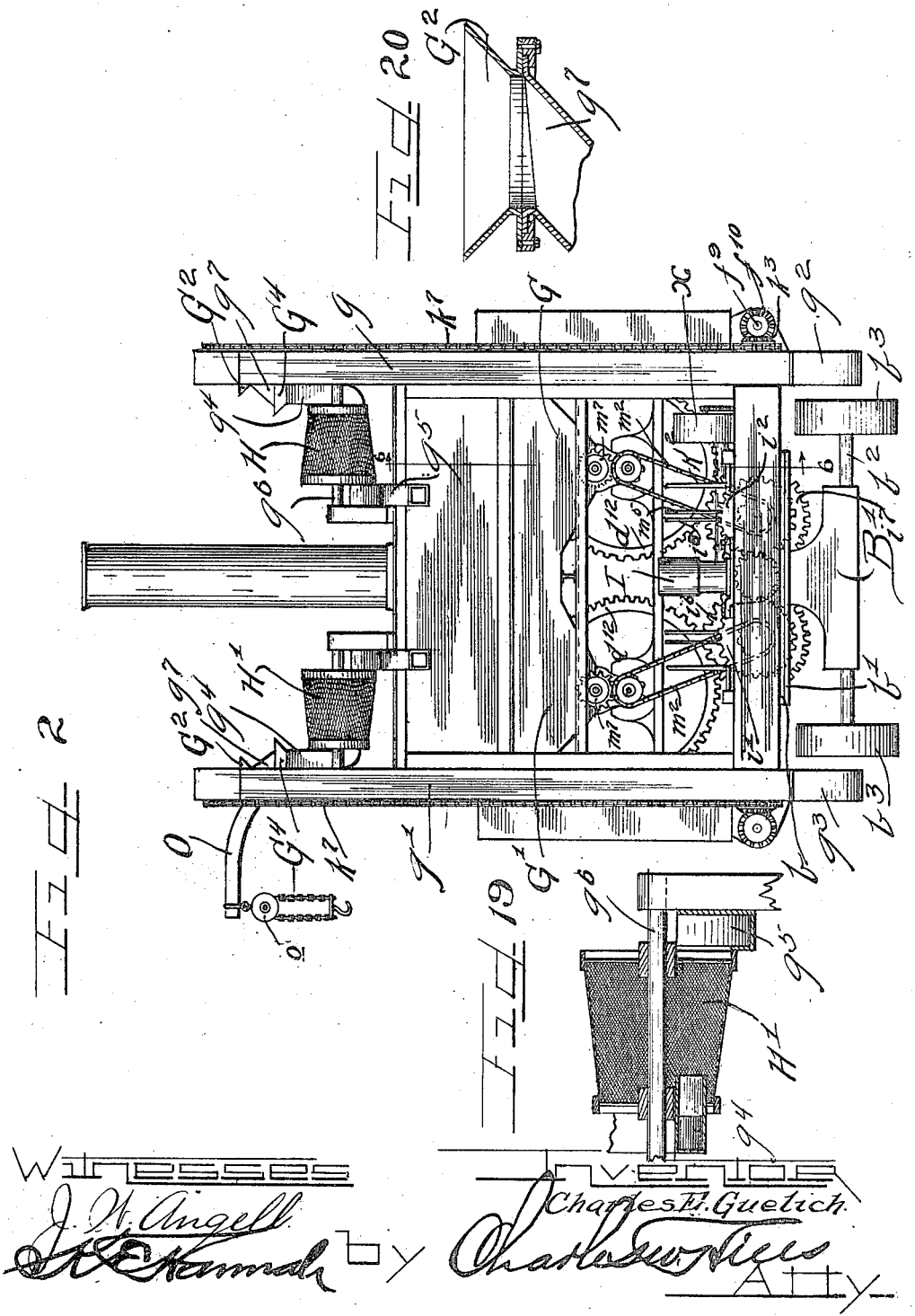

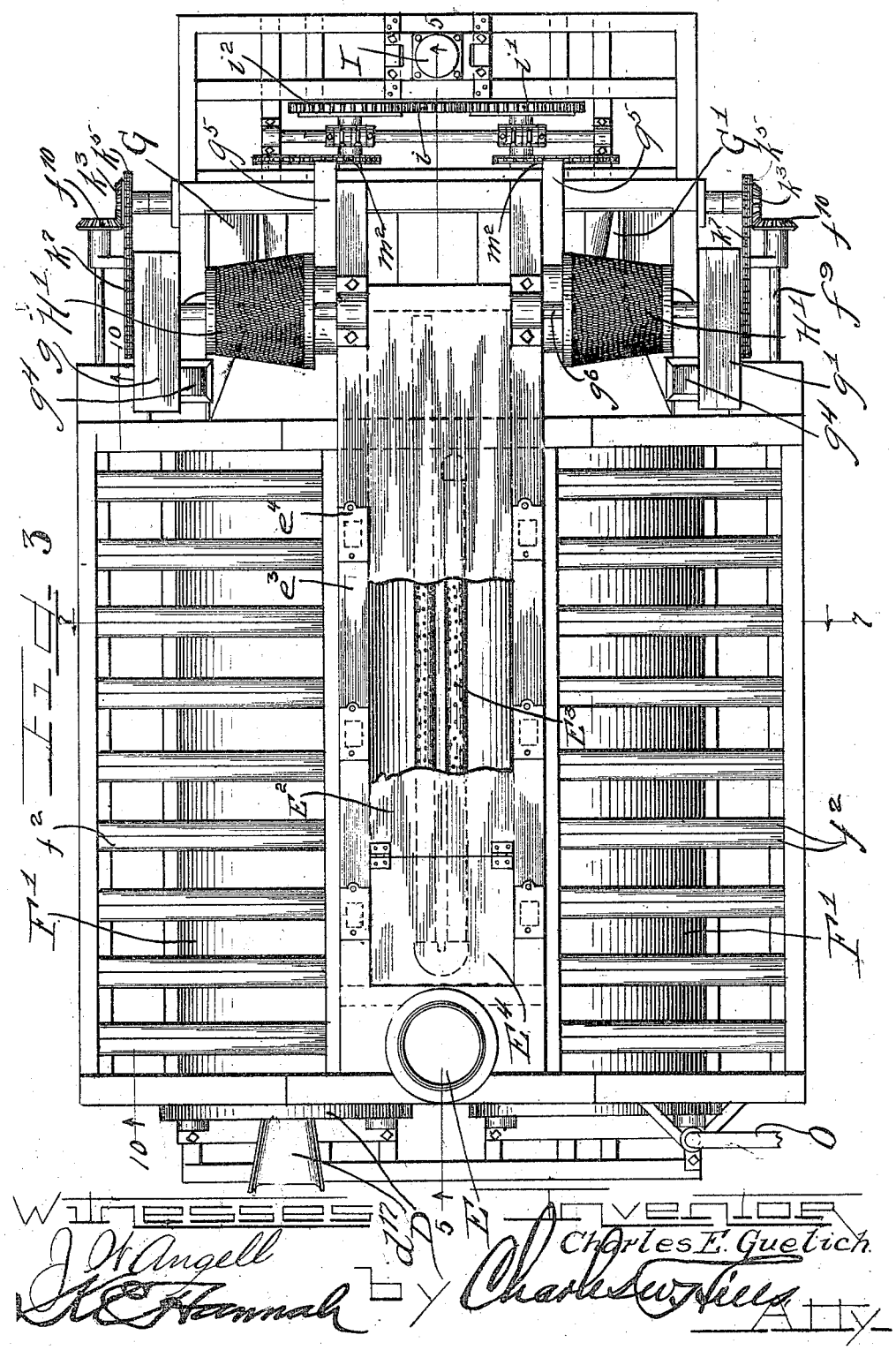

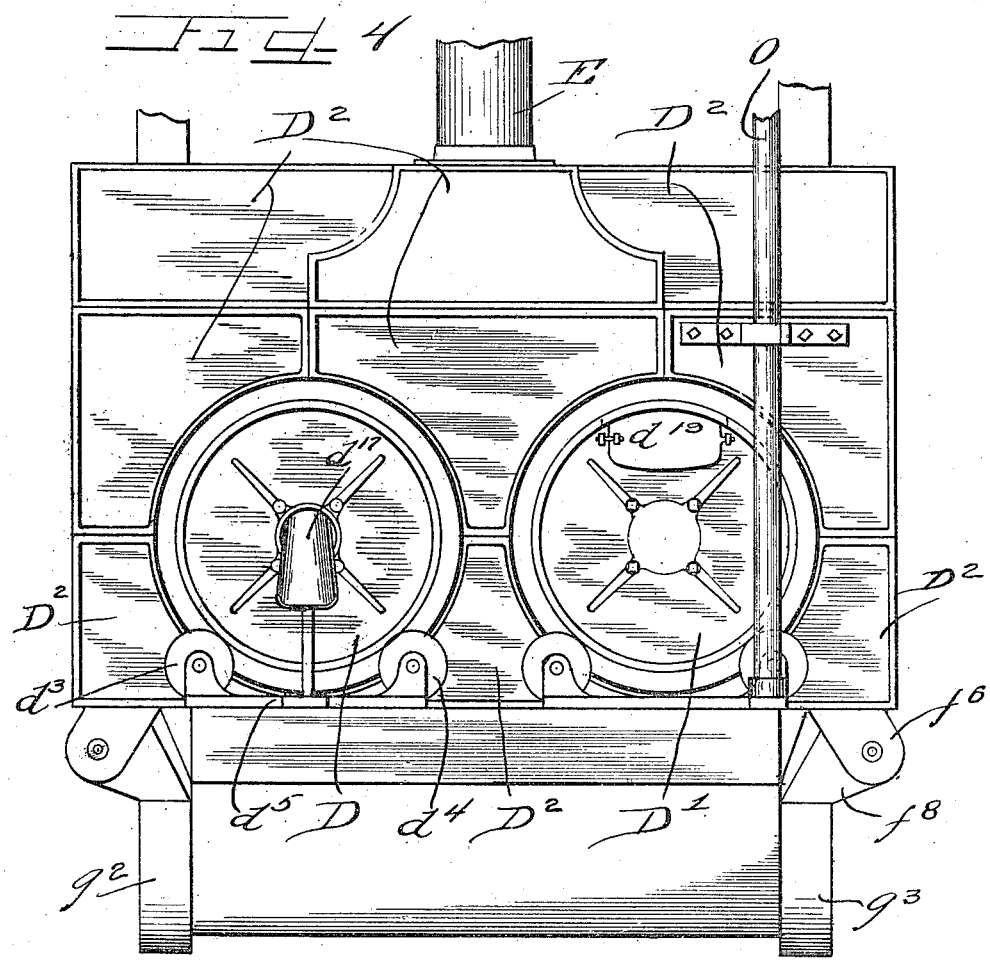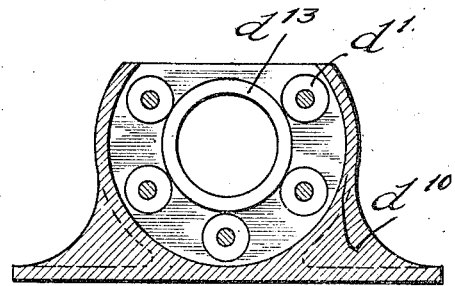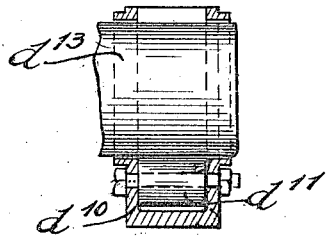

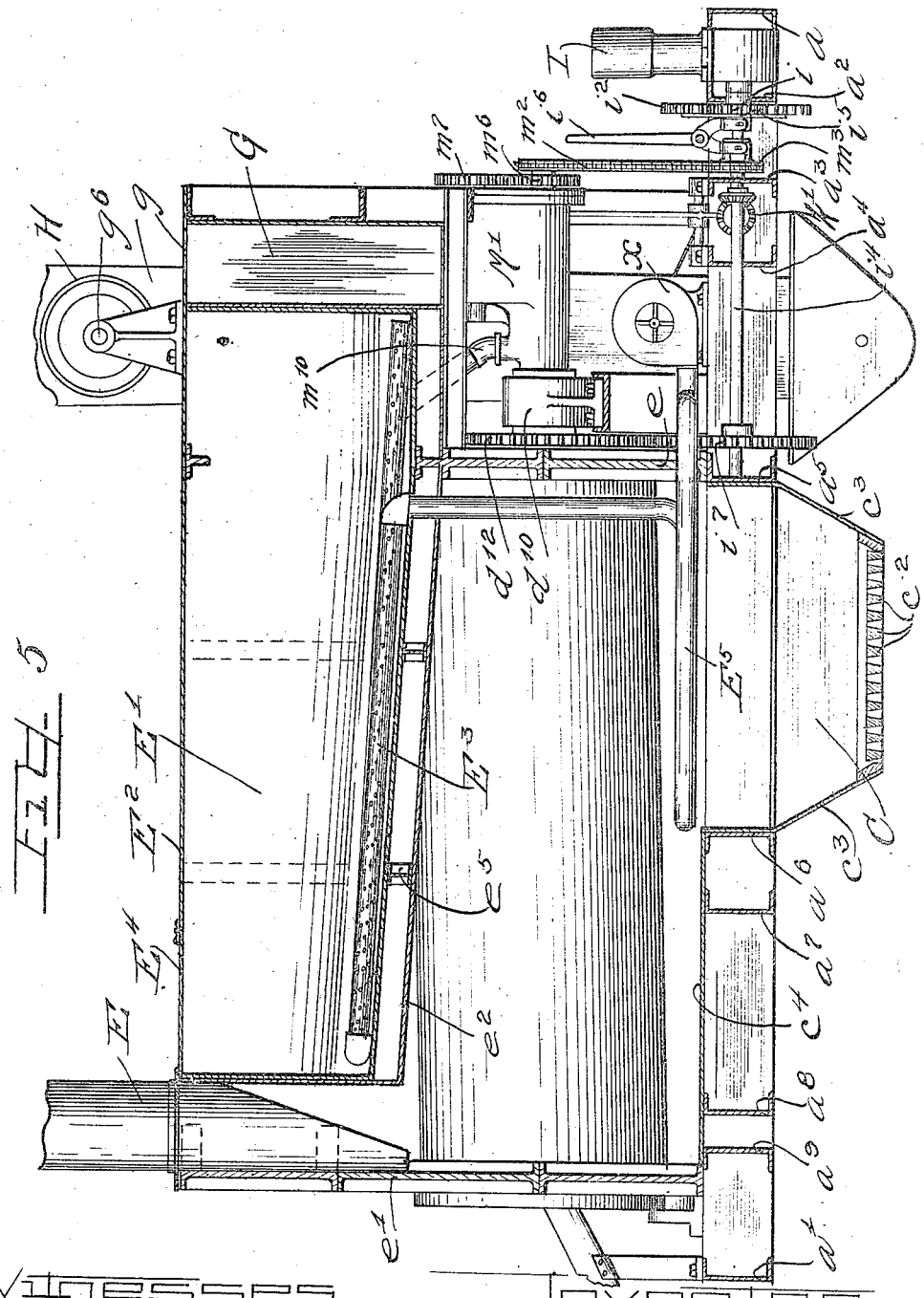

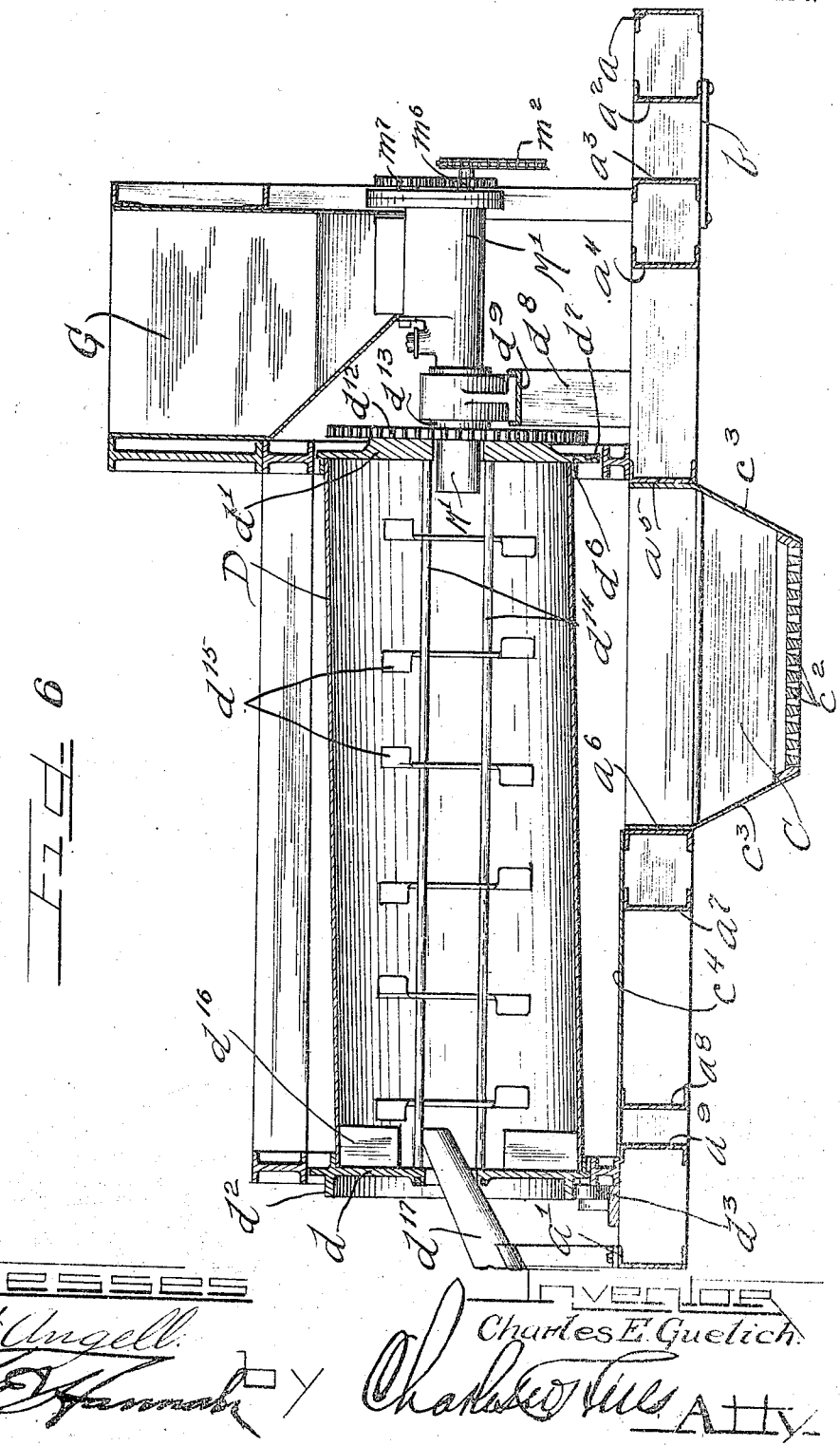

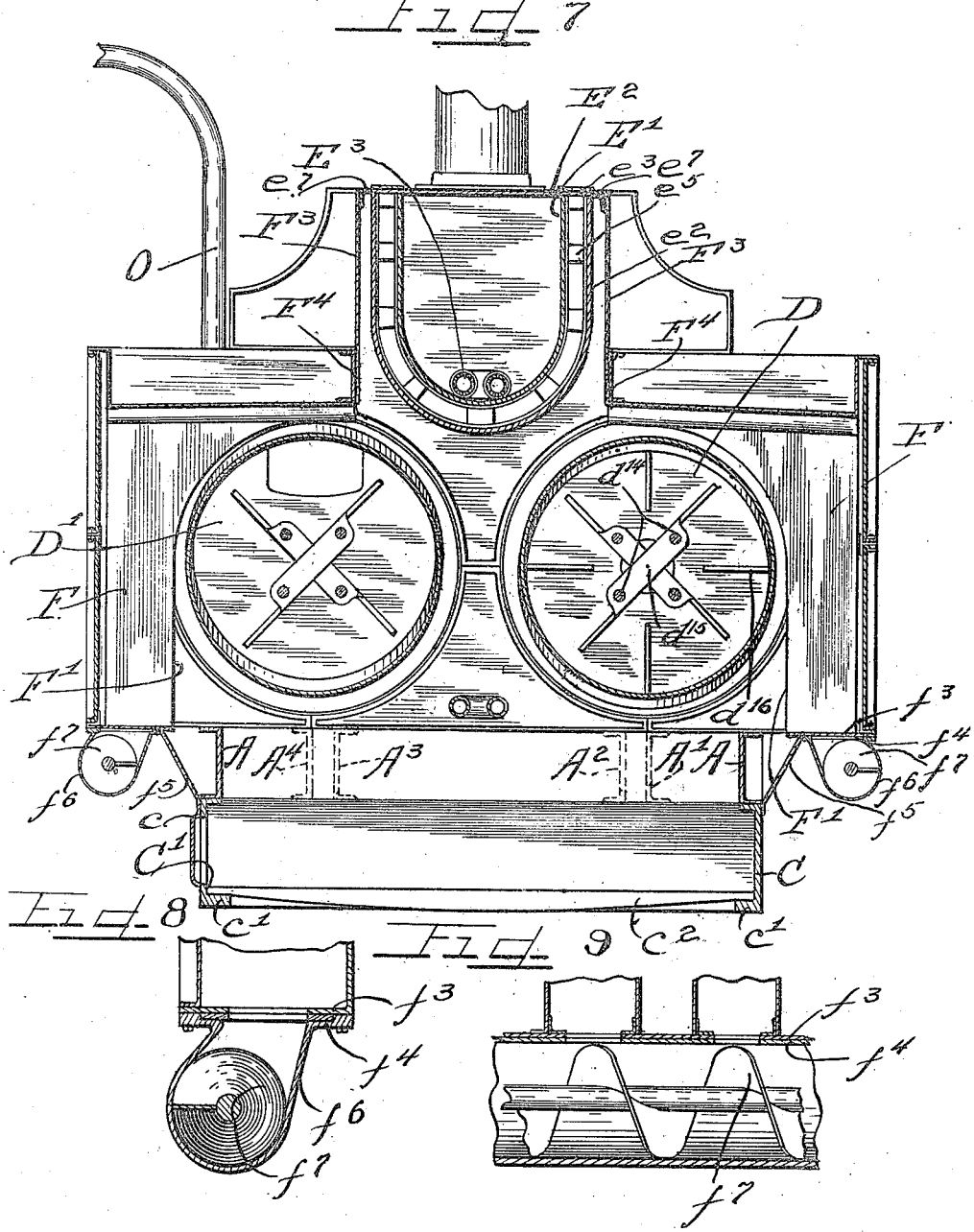

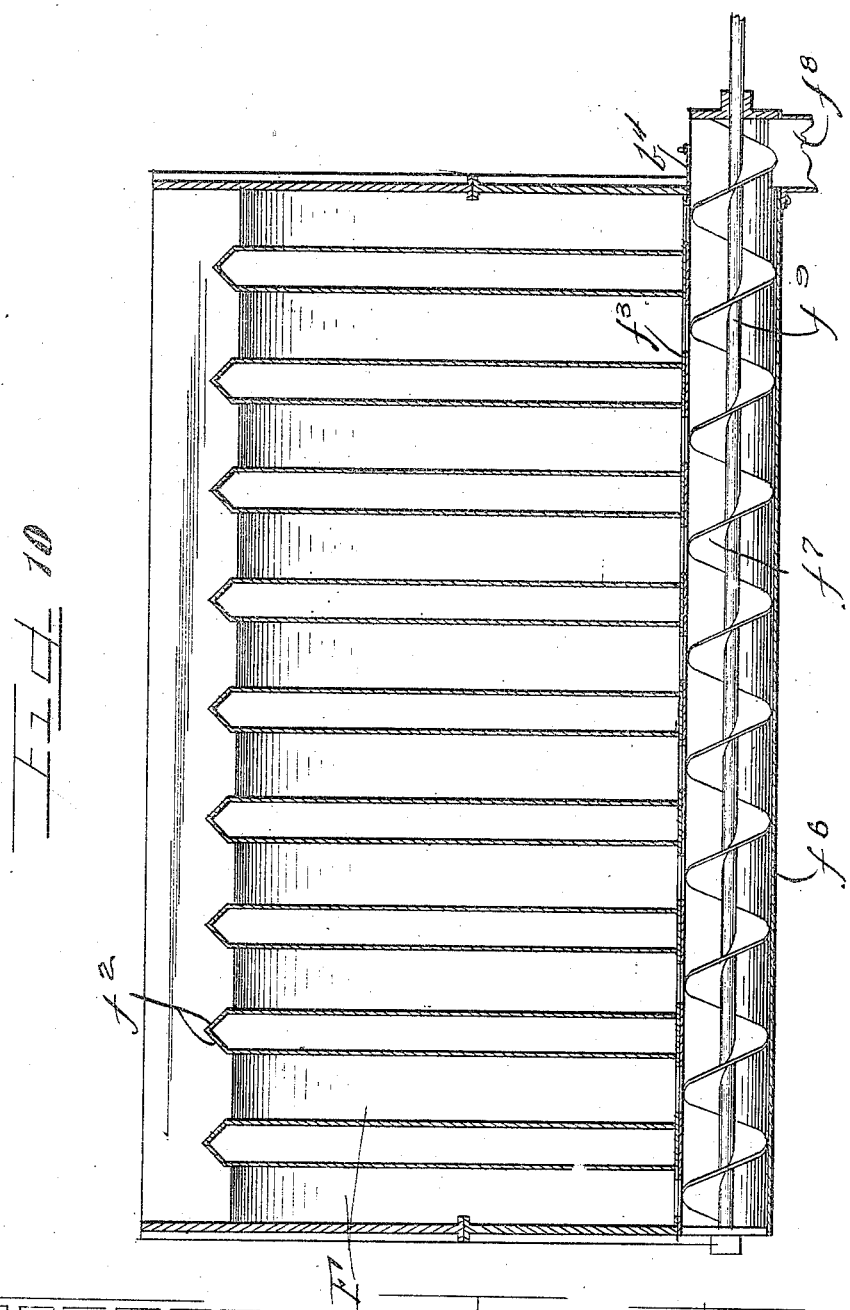

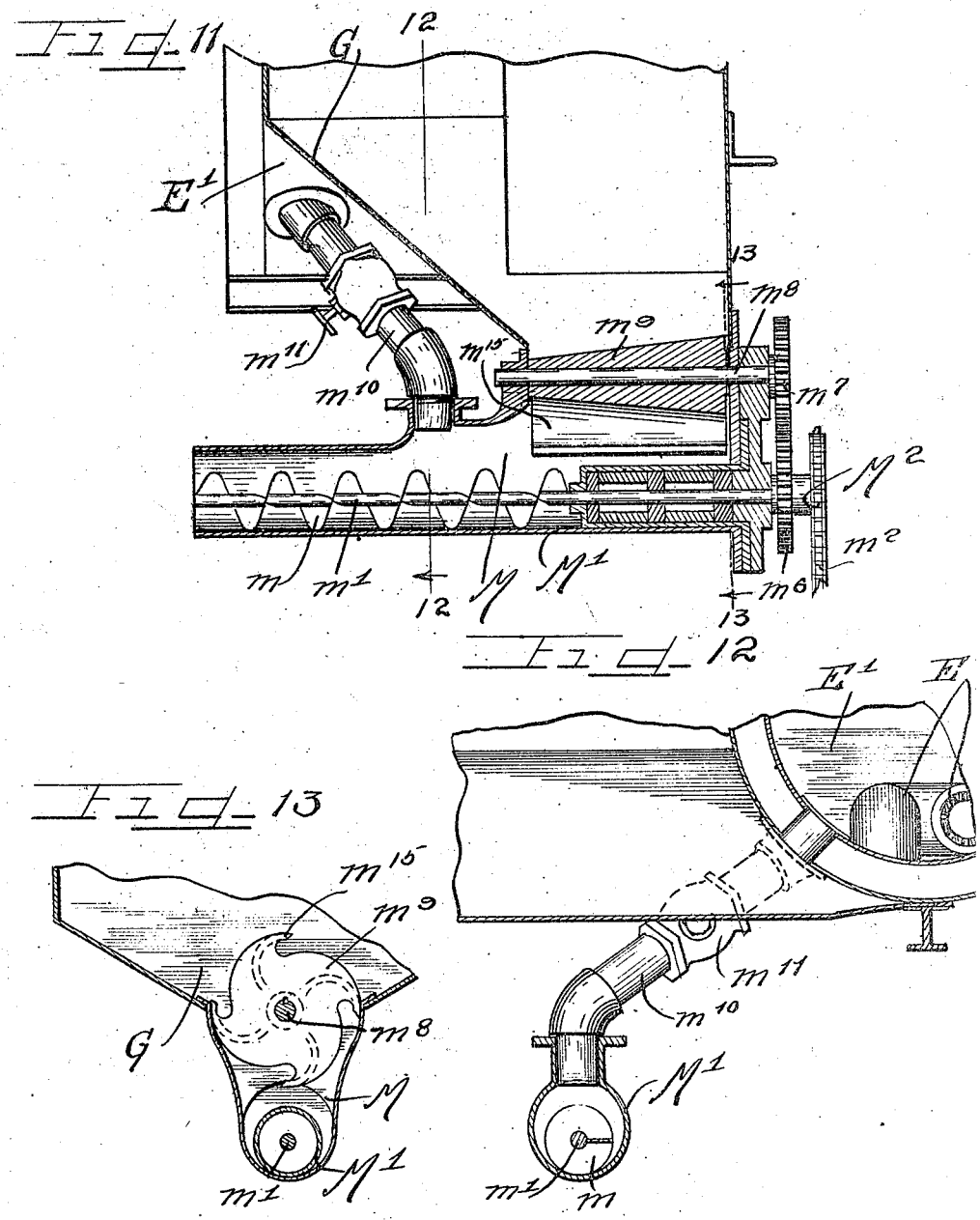

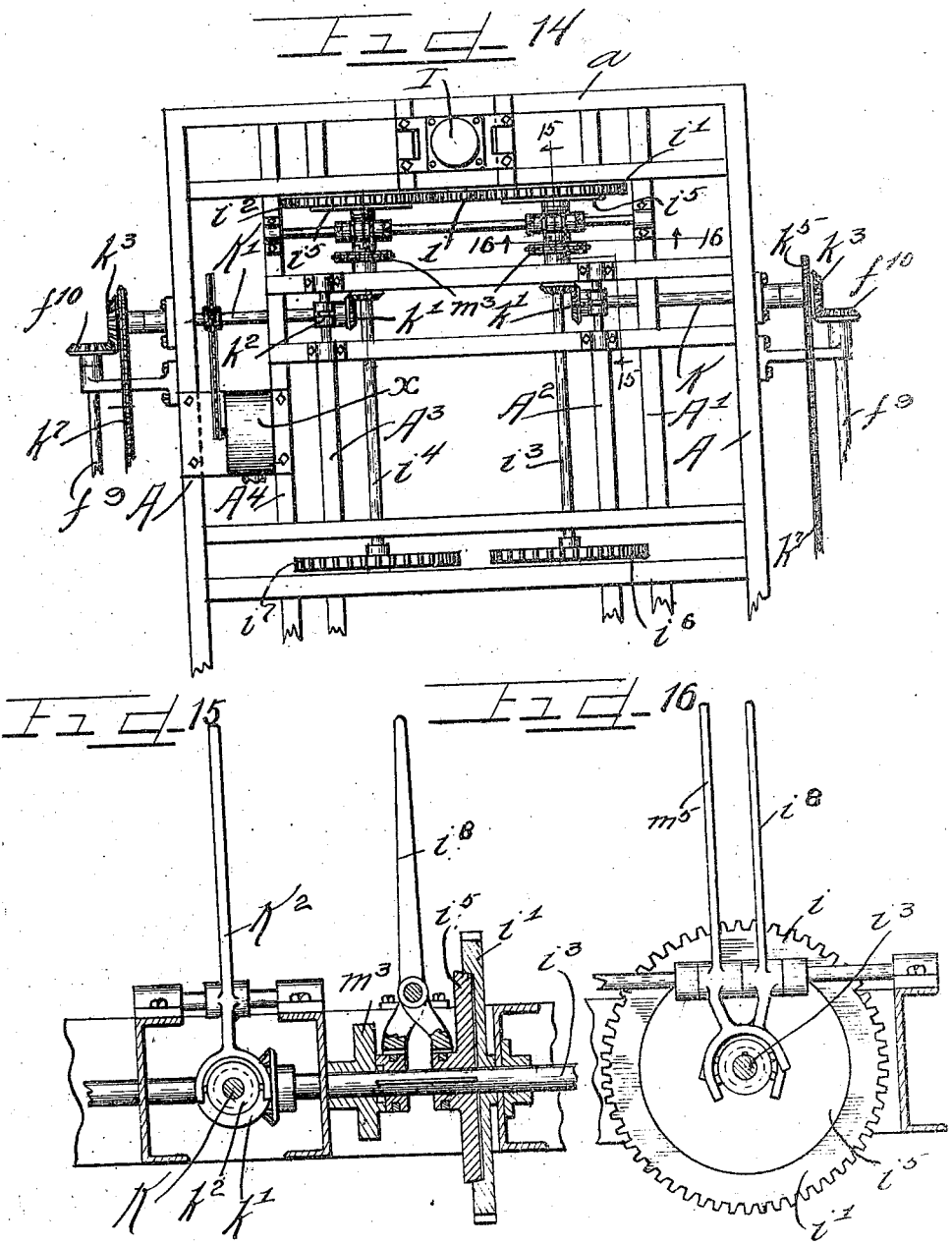

CHARLES E. GUELICH, OF CHICAGO, ILLINOIS.

PORTABLE ASPHALT PLANT.

1,007,689.

Specification of Letters Patent. Patented Nov. 7, 1911.

Application filed March 14, 1908. Serial No. 421,006.

*To all whom it may concern:*

Be it known that I, CHARLES E. GUELICH, a citizen of the United States, and a resident of Chicago, Cook county, Illinois, have invented certain new and useful Improvements in Portable Asphalt Plants; and I do hereby declare that the following is a full, clear, and exact description of the same, reference being had to the accompanying drawings, and to the letters of reference marked thereon, which form a part of this specification.

The machines for preparing and mixing asphalt and like materials for paving purposes have not usually been portable, and machines have not usually been adapted to cook the material but have merely served to warm the asphaltum sufficiently to render it more or less liquid preparatory to mixing therewith the other constituents to be used in the construction of the work. In fact it is nearly a universal practice if the asphaltum is to be heated to perform the heating in a kettle stirring the mass by hand.

The object of this invention is to provide a portable furnace containing a mixing and cooking mechanism for the purpose described, the construction of which, in view of the nature of the work to be performed, though light as compared with previous machines possesses great strength.

It is also important to so construct and so mount the furnace as to readily permit of its being moved on the job, or if preferred, under its own power.

It is also an object of the invention to afford a construction in which the sand and other granular material to be mixed with the asphaltum or the like are thoroughly dried and heated in the furnace whereby the asphaltum is melted and the mixture ultimately cooked.

It is a further object of the invention to afford mechanism whereby the material designed to be mixed with the asphaltum may be elevated to the top of the machine from whence together with the previously melted asphaltum it passes partly by gravity into the cooking and mixing apparatus and to provide means whereby the proportions of the ingredients may be at all times satisfactorily regulated by the operator.

Another important object of the invention is to afford in connection with the cooking and mixing mechanism and the sand drying and elevating apparatus, an elevated caldron wherein the asphaltum is first melted preparatory to delivery into the cooker, said caldron being so constructed that though subjected to the heat of the cooking and drying furnace, its contents can never burn therein.

Another object of the invention is to insure easy regulation of the amount of heat imparted to the contents of the caldron.

A further object is to afford means for partly mixing the material while delivering to the mixing and cooking cylinders.

A very important object of the invention is to provide a hermetically sealed cooking cylinder or cylinders exposed directly to the heat of the furnace, said cooking and mixing cylinder being so constructed, mounted and operated as to dash the contents alternately from end to end and from side to side in the cylinder during the rotation of the cylinder, at the same time owing to the rotational movement of the cylinder subjecting the mass to the action of stationary mixing blades and retaining all the volatile ingredients of the asphaltum and also retaining the fine materials or fillers.

It is an important object of the invention to apply the heat to all parts of each cylinder at all times thus as the cylinder rotates delivering the material upon a surface heated to a temperature greater than that of the cooking material and constantly turning and mixing the mass to bring all parts thereof against the hot shell momentarily, thereby enabling a higher temperature to be used in cooking than heretofore possible without burning.

It is also important to provide melting, drying and cooking means all exposed to the heat and in a single furnace.

The invention embraces many other novel features and consists in the matters hereinafter described and more fully pointed out and defined in the appended claims.

In the drawings: Figure 1 is a side elevation of a device embodying my invention. Fig. 2 is a front elevation thereof. Fig. 3 is a top plan view thereof. Fig. 4 is a rear elevation of the same with parts broken away. Fig. 5 is a section taken on line 5—5 of Fig. 3. Fig. 6 is a section taken on line 6—6 of Fig. 2. Fig. 7 is a section taken on line 7—7 of Fig. 3. Fig. 8 is an enlarged transverse section of one of the sand conveyers. Fig. 9 is a fragmentary longitudinal section of a part of the conveyer casing illustrating the means for regulating the delivery of the sand to said conveyer. Fig. 10 is a section taken on line 10—10 of Fig. 3. Fig. 11 is an enlarged fragmentary detail section of the feeder. Fig. 12 is a fragmentary section on line 12—12 of Fig. 11. Fig. 13 is a fragmentary section on line 13—13 of Fig. 11. Fig. 14 is a fragmentary top plan view of the front or driving end of the machine illustrating the driving connection between the motor and the various parts of the device. Fig. 15 is an enlarged fragmentary section on line 15—15 of Fig. 14. Fig. 16 is an enlarged fragmentary section on line 16—16 of Fig. 14. Fig. 17 is an enlarged vertical transverse section of the anti-friction bearing provided for the front or receiving end of the cooking and mixing cylinders. Fig. 18 is a longitudinal section thereof with the tubular gudgeon for said cylinders shown in elevation. Fig. 19 is an enlarged fragmentary detail of one of the screens. Fig. 20 is an enlarged detail of one of the receiving spouts for the screen.

As shown in the drawings, said furnace or plant is constructed on an exceedingly strong and rigid frame of structural steel, channel bars being shown in the drawings, though, of course, other structural forms may be used. Said frame comprises side sills A, and two pairs of center sills $A'$—$A^2$ and $A^3$—$A^4$, which are disposed intermediate the side sills and the longitudinal center of the frame and directly beneath the mixing and cooking cylinders hereinafter described. Said side and center sills are rigidly connected, at the ends by end sills $a$—$a'$, and other transverse sills $a^2$ to $a^9$ inclusive. Of these transverse sills, the sills $a^2$—$a^3$ and $a^8$—$a^9$ are arranged at about the points to serve as bolster sills for the trucks. As shown a suitable bearing plate $b$, circular in form, is bolted beneath the sills $a^2$—$a^3$ centrally of the frame and bears on a rotatable fifth wheel $b'$, which is rigidly secured to a bearing member $B'$, through which the axle $b^2$, for the front wheels $b^3$ extends. The rear axle $b^4$ is secured in any suitable manner to the bearing members B, attached to the transverse sills $a^8$—$a^9$, and secured on the ends of said axle are wheels $b^5$. The construction affords an exceedingly rigid frame, and also a suitable truck construction to enable the machine to be easily moved. Inasmuch as the wheels $b^3$ are entirely below the main frame of the furnace the front wheels can turn under the frame enabling very short turns to be made.

The fire pot is constructed in the middle of said frame and extends transversely for the entire width. For this purpose as shown, the transverse sills $a^5$—$a^6$ are set a considerable distance apart and the center sills extending from each end are rigidly secured to said transverse sills $a^5$—$a^6$, and may be omitted between said sills, thus affording a relatively large rectangular open space. Bolted on the under side of each side sill A, with their backs turned outwardly are channels C—$C'$. These are provided with very broad webs, to afford a sufficient depth for the firepot and as shown, the web of the channel $C'$ is cut away to provide a door opening for the admission of fuel and an ordinary furnace door $c$, is hinged to the channel on the outer side to close the opening. Resting upon the lower inwardly directed flanges $c'$ of said channels C—$C'$ are grate bars $c^2$ of any suitable construction. As shown said channels C—$C'$ are cut at their ends so that the ends of the firepot formed between said channel bars taper downwardly as indicated in Figs. 1, 5 and 6. Secured to the ends of said channel bars C—$C'$ in any suitable manner and extending transversely the machine and forwardly to cover the inner sides of the sills $a^5$—$a^6$ are metallic plates $c^3$. As shown also the main frame is decked or covered to near the rear end thereof with metallic plates $c^4$ though any non-combustible material may be used.

Mounted upon the frame with the axes thereof above the center sills $A'$—$A^2$ and $A^3$—$A^4$ respectively, are the mixing and cooking cylinders D—$D'$. These, as shown, each comprise a cylindric shell constructed of steel plates or boiler iron, and provided at each end with a normally closed head $d$—$d'$. As shown, the rear head $d$, of said cylinder D, is provided with an inwardly directed flange within which the end of the cylinder fits, and to which the same is rigidly secured by riveting or other suitable means, and is also provided with an outwardly directed flange $d^2$, eccentric with the end of the cylinder, as shown in Fig. 6. Said flange rests upon rollers $d^3$—$d^4$ rotatably secured on a suitable base $d^5$, rigidly secured on the frame, and which support the rear end of the cylinder affording an eccentric antifriction bearing for the cylinder end. The forward end or head of the cylinder $d'$ is likewise provided with an inwardly directed flange $d^6$, in which the forward end of the cylinder shell fits and is secured. Said head is circular and is considerably greater in diameter than the shell of the cylinder and the flange $d^6$ is arranged eccentrically on said head to correspond with the eccentric disposition of the flange $d^2$, on the rear side of the head $d$. In consequence a peripheral eccentric rim $d^7$, is provided at the circumference of the head $d'$, and a circular aperture is provided which from the construction described is eccentric with the end of the cylinder, as shown in Fig. 6.

On each side the frame is an upwardly extending post $d^8$, and extending across the top of and transversely of the machine is a connecting channel bar or beam $d^9$. Rigidly bolted on said transverse beam are the bearing members for the forward end of each cylinder. Each of these, as shown, comprises a housing or cage $d^{10}$ having a central cylindric aperture therethrough in which antifriction rollers $d^{11}$ are journaled. Rigidly secured on the forward end or head of the cylinder and concentric with the head is a spur gear $d^{12}$ the hub $d^{13}$ of which is cylindric and adapted to fit in the bearing member or cage $d^{10}$ between the rollers $d^{11}$, and on which the front end of the cylinder is thus supported. Said hub $d^{13}$ is tubular having a large cylindric bore therethrough, and through which extends the cylindric discharge end of a mechanical feeder hereinafter described.

Rigidly secured on and connecting the heads $d$—$d'$ and extending longitudinally the cylinder are rods $d^{14}$ four in number and rigidly engaged on diametrically opposite rods and disposed alternately the entire length of the rods are mixing blades $d^{15}$, each comprising a bar or plate of steel or other suitable material, apertured to receive the rods therethrough, and the ends of which are turned to lie in planes extending longitudinally the cylinder. Said ends extend close to the cylinder walls. As shown, the cylinder is provided with a discharge aperture at the center of its rear head $d$, adapted to be tightly closed during the cooking operation but adapted to receive the discharge chute or spout $d^{17}$, therein, as shown in Figs. 4 and 6, when cooking and mixing are completed. For the purpose of directing said material into said chute or spout to mechanically discharge the contents relatively broad shelves or plates $d^{16}$ are secured at suitable distances apart radially of the shell and bear against the head $d$, so that as the cylinder rotates the material is carried upwardly by said plates at the end of the cylinder and dropped therefrom into the chute.

The cylinder D' is mounted and constructed in all particulars as described with reference to the cylinder D except that the rear head of said cylinder is closed at the center in any suitable manner, and the discharge gate $d^{19}$ is provided in the cylinder head in such a position that said gate is at the bottom of the cylinder when the inclination of the cylinder is greatest toward the rear, thus when the gate is opened permitting the material to flow or to be drawn from the cylinder, gravity assisting the same owing to the inclination of the cylinder.

Suitably shaped plates $D^2$, which may be of cast metal are arranged to afford a tight wall at the rear end of the machine and through which the ends of said cylinders protrude. For the purpose of ready installation and repair said wall is constructed in sections which fit to each other and to the cylinders to afford tight joints, and may assume a variety of forms depending upon the number of cooking and mixing cylinders and the disposition of the same upon the frame, and similar plates form also the front end and side walls of the furnace which contain the cooking and mixing cylinders.

Supported in any suitable manner above and between said cylinders D—D', as shown, in Figs. 3, 5 and 7 and forming a part of the furnace top is a caldron or kettle in which the asphaltum or other plastic material to be used may be first melted. Said caldron indicated by E' is conveniently supported at its front end upon the front furnace wall $e$, and is supported at its rear end by means of struts, which may extend to and connect with the rear transverse wall $e'$ or upon any suitable structural frame adapted to carry the weight thereof to the main frame. As shown, the caldron is constructed of sheet metal and has a concave bottom which inclines downwardly toward the front of the machine. The side walls of the caldron extend to a considerable height to afford the desired capacity. As shown, the caldron is jacketed by an outer casing $e^2$ similar in shape and curvature to the inner shell and against which the heat of the furnace after having passed around or between the cylinders is directed. Said outer casing is spaced from the inner by means of spacing blocks $e^5$. Between the outer and inner shell a stratum of air is provided which affords an air jacket and which is closed at the top by means of a continuous cover plate $e^3$ extending the entire length of the caldron on each side thereof. Said plate $e^3$ is provided at intervals with apertures normally closed by removable covers $e^4$, as shown in Fig. 3, which permit the temperature within the jacket and consequently the temperature imparted to the mass in the caldron to be regulated by opening or partly opening or by closing said apertures. Said caldron is provided with a tight fitting cover $E^2$ provided with a tight fitting door therein through which to fill the caldron, and extending along the bottom is a perforated air pipe $E^3$, which is connected with a heating coil $E^5$ positioned to receive the direct heat from the furnace. A fan or pump $x$ mounted on the frame is connected with the coil whereby fluid in a heated condition may be forced into the caldron and any desired pneumatic pressure maintained therein. The heated air escaping from the pipe agitates the bitumen while melting, also facilitating the melting thereof and aids in forcing the melted bitumen from the caldron.

It is exceedingly important to thoroughly dry the sand and other granular material used with the bitumen in the production of asphalt pavings or floors and failure to dry this material always results in imperfect work. To enable this to be readily and perfectly accomplished a number of drying bins or compartments F, are provided in the furnace and at the outer side of each cylinder. Said compartments are constructed of sheet metal and any desired number may be used. The outer walls thereof are spaced a short distance from the metallic side walls $f$ of the furnace to afford complete circulation around the bins. The inner walls thereof F' extend upwardly and inwardly around and over the cylinders but out of contact therewith, as shown in Fig. 7, and to within a short distance of the jacket of the caldron and are connected across their fronts by a structural bar $F^4$ and with the caldron by means of upwardly directed plates $F^3$ which are bolted to the bar $F^4$ and to an angle bar $e^7$ which is bolted to the shell $e^2$ and which closes the top to prevent loss of heat. Each of said compartments F is spaced a distance from the adjacent compartment, to afford therebetween a fire flue and adjacent sides of adjacent compartments or bins are connected at the top by means of inclined walls $f^2$, as shown in Figs. 3 and 10, preventing the escape of heat upwardly from between said compartments and insuring the direction of the heat around the cylinder and against the caldron jacket. Said compartments all rest upon and are secured to a suitable metallic or other plate $f^3$, which affords a bottom for all said compartments and through which are provided apertures adapted to be closed by a sliding plate $f^4$, affording a valve opening through the bottom of each compartment.

Secured to and extending upwardly and outwardly from the lower flange of the side sills A, is an inclined metallic plate $f^5$, which is bolted to the floor of the drying compartments and acts to carry the weight of the bins and their contents to the sills. Secured thereto and to the bottom of the floor of said compartments at its inner edge and its outer rigidly bolted to the side walls of the machine at the bottom thereof is a cylindric conveyer casing $f^6$, in which at the axis thereof is a rotatable worm conveyer $f^7$, whereby the sand or other material from said drying compartment may be delivered to the discharge chute $f^8$ at the front end of the casing.

At the front end of the machine are provided elevated hoppers G—G', two in number and above which are supported separating screens H—H'. Said screens as shown, are shaped as frustums or cones with open ends and the smaller ends directed outwardly and are rigidly secured on rotatable shafts $g^6$, one above each of said hoppers, as shown in Figs. 2 and 3. Extending upwardly on each side of the machine are elevators $g$—$g'$, the lower ends of which extend into a wide boot $g^2$—$g^3$, into which the delivery pipes $f^8$, from the conveyers $f^7$ discharge. These elevators may be of any suitable kind adapted to transfer the dried material from the boots to the screens. The elevators discharge into a hopper $G^2$, from which a pipe $g^7$ conveys the material into a hopper $G^4$, and a suitable pipe or spout $g^4$ opening therefrom empties into the smaller end of the screen or separator. Said pipe $g^7$ is connected with the hopper $G^2$ by means of a swivel or other suitable joint Fig. 20, adapting the pipe to be rotated to deliver material either to the screens or to the drying bins. The finer material or that suitable for the required use falls through the screen and into the respective hopper G—G' and any material too coarse for such use falls from the larger end of the separator screens into a spout $g^5$, from whence it is delivered from the machine.

Of course, any suitable source of power may be employed for driving the various mechanisms with which the machine is equipped. As shown, however, and conveniently, an explosive or internal combustion motor or engine I is supported on the front end of the machine and a gear wheel $i$ is secured on the shaft thereof and may also serve as the balance wheel for the engine. Said gear intermeshes with gears $i'$—$i^2$ rotatably secured on the shafts $i^3$—$i^4$, which extend longitudinally of the machine below each of the cooking cylinders. Feathered on the shaft is a clutch member $i^5$, adapted to be actuated by a lever $i^8$, whereby the desired gear $i'$—$i^2$ may be made to rotate its shaft. Below each cylinder and on the corresponding shaft is provided a spur gear wheel $i^6$—$i^7$. These mesh respectively with the gear wheels $d^{12}$ secured to the front head of each cylinder whereby either cylinder may be driven from said engine independently of the other and of course, both may be operated at the same time if desired.

As shown in Figs. 14 and 15, jack shafts K—K' extend transversely the shafts $i^3$—$i^4$ and outwardly through and beyond the side sills and at their inner ends are each provided with a bevel gear $k'$ normally rotatable on said shaft but adapted to be readily engaged thereto by means of a clutch member $k^2$ operated by a lever $K^2$ therefor extending upwardly in convenient relation with the levers for operating the main shafts. On the outer ends of each of said jack shafts is a beveled pinion $k^3$, which meshes with a bevel pinion $f^{10}$ rigidly secured on the end of the conveyer shaft $f^9$, whereby the conveyer from the drier is actuated. As shown, a sprocket wheel $k^5$, is also provided on the end of each jack shaft K—K' and trained around the same and over a suitable sprocket wheel $k^6$, on the upper end of the elevator is a sprocket chain $k^7$ which drives said elevator. This also is trained upon a sprocket wheel $k^8$, rigidly secured on the end of the screen shaft $g^6$, so that operation of the elevator at all times of necessity rotates the screen simultaneously.

Means are provided for delivering a graduated amount of the dried and heated granular material and of the melted bitumen or other plastic material in a partly mixed state into each or either of the cylinders. For this purpose as shown, a feeder indicated as a whole by M, is provided for each cylinder. This comprises a casing M' rigidly secured at the bottom of each hopper and into which the hopper discharges through a suitable valve $m^9$ which regulates the amount of the granular material to be delivered and from whence the granular material is conveyed to the cylinder and in its passage mixes with the bitumen in a liquid or viscid state. The casing for said feeder is cylindric at its rear end and extends through the tubular hub $d^{13}$, of the gear $d^{12}$, on the front end of the cylinder and projects somewhat within the cylinder. Journaled within the bottom of said casing is a worm conveyer $m$, the shaft $m'$ of which extends through suitable bearings at its forward end and at its extremity is provided with a sprocket wheel $M^2$, whereby said conveyer is driven. For this purpose a sprocket chain $m^2$ is trained around said sprocket wheel $M^2$ and a sprocket wheel $m^3$, rotatably secured on the shaft $i^3$ or $i^4$, and which is adapted to be engaged to the shaft by means of a clutch actuated by a lever $m^5$, as before described with reference to the clutch whereby said shaft $i^3$ is rotated. A spur gear $m^6$ is provided on said conveyer shaft and meshes with the spur gear $m^7$ secured on the shaft $m^8$, which rotates the measuring valve closure $m^9$. Said closure fits closely in the discharge orifice of the hopper, and regulates the discharge therefrom, as shown more fully in Figs. 11 and 13, and comprises a body having oppositely disposed arms or blades $m^{15}$ curved in the direction of the rotation thereof and which at all times closes the bottom of the hopper. As the closure rotates, however, the pockets formed between the blades fill with the granulated material carrying the same into the discharge chute of the hopper and delivering the same to the conveyer within the casing. In this manner the rate of delivery of the contents of the hopper to the feed conveyer may be readily controlled by regulating the drive of the measuring valve closure. Said granular material having entered the feeder is encountered in its passage to the cylinder by the melted bitumen which flows into the top of the feeder from the caldron under pneumatic pressure through a pipe $m^{10}$, controlled by a valve $m^{11}$, whereby the exact rate of flow of melted bitumen can be controlled. The material thus brought together is given a preliminary mixing in the feeder and passes into the respective cylinders in a somewhat warm condition.

The operation is as follows: The sand or other granular material is first filled into the drying compartments or bins and for this purpose the elevators may be used, the sand being shoveled or delivered into the boots which are made sufficiently wide at the bottom to conveniently permit this to be done. As the material is elevated the spout $g^5$, or any other suitable spout may be turned rearwardly and so adjusted as to receive the discharge from the elevators and deliver the same into the drying bins. Having filled the drying bins, bitumen or other plastic material to be used is placed in the caldron E'. For this purpose a crane O is supported on the rear end of the machine and provided with suitable tackle $o$, to permit the bitumen to be readily elevated and dumped into the caldron, said crane swinging freely to facilitate this.

The heat from the furnace passes upwardly around the cylinders and through the fire flues between and around said drying bins and of course, also between said cylinders and not only serves to rapidly and efficiently dry the granular material in the bins and to heat the material in the cooking and mixing cylinders but also heats the contents of the caldron. The air jacket, however, prevents burning. Melting is facilitated by the agitation occasioned by the air escaping from the pipe $E^3$ though mechanical means for stirring may be used if desired. Any smoke escapes through the stack E opening from the top of the furnace.

Having reduced the bitumen to the desired consistency and having the granular material sufficiently dry and hot, the operation of mixing and cooking begins. The levers $i^8$ are shifted to throw the clutch $i^5$ into engagement with the gear wheel $i'$; in consequence the shafts $i^3$ or $i^4$ or either of them dependent whether one or both cylinders are to be used, is actuated with the effect of rotating the cylinders singly or simultaneously. The lever $K^2$, being actuated, the corresponding conveyer from the driers and the elevators are thrown into operation. The dried material is now delivered from the drying compartments to the elevator and thence to the separating screens where the material of suitable grade passes through into the hoppers and the residue is discharged from the machine. The lever $m^5$ may now be actuated to drive the mixing valve and the valve $m^{11}$ from the bitumen caldron is opened to provide a sufficient flow from the caldron dependable on the pressure. The granular material scooped up by the closure $m^9$ at the rate of delivery dependent upon the drive of said valve is passed into the feeder, and is pushed along by the conveyer until it is brought into position to receive the flow of hot bitumen thereon coming under air pressure from the caldron. The worm conveyer, of course, continues its operation serving to mix the material partly and delivers the same therefrom hot into the cooking and mixing cylinders.

Owing to the eccentricity of the bearings for both ends of said cylinders the cylinders rotate first with one end and then with the other end low. In consequence the material admitted into the cylinder during the entire progress of the cooking operation is dashed from one end to the other of said cylinder, and also laterally being projected thereby against and between the mixing blades until the entire mass is thoroughly mixed. This is accomplished very quickly. Inasmuch also as each entire cylinder is exposed to the direct heat from the furnace at all times, the heated mixture during the cooking operation can never fall upon a colder surface but instead falls constantly upon a surface having a temperature higher than itself. In consequence the temperature is very rapidly raised to the cooking point without possible danger of burning and owing to the movements of the mass within the cylinder, all parts of the mass are brought intimately into contact with the hot shell and almost immediately removed therefrom thus enabling a much higher temperature to be used than would otherwise be safe or possible and permitting the mass to be very thoroughly cooked in a much less time than has heretofore been deemed possible.

The cylinders and caldron being tightly closed during the entire operation of the device it follows that none of the volatile constitutents of the bitumen which really impart vitally important qualities to the final product can be lost, nor can any portion of the finely granular or pulverized filler escape from the machine; in consequence the final proportions and resulting qualities can always be foretold and regulated to insure the desired product and results.

Of course, the operation is practically continuous if desired. The sand or dry granular material may be continuously elevated to the separating screens and delivered to the hoppers and bitumen may be passed into the caldrons as required and the cooked and mixed batch from one of the cylinders may be immediately replaced by another to be cooked and mixed therein. As a result inasmuch as the material is not permitted to cool in any part of the mechanism there is no tendency to clog up the machine or for any portions of the mixture to adhere and burn onto the drum or any other parts of the machine and no chance for caking.

When it is desired to discharge a cylinder, as for instance D, the closing plate is removed from the discharge aperture and the spout or chute is inserted through the aperture at the axis of the cylinder and the blades $d^{16}$ act successively to elevate the mixed mass or portions of the mixed mass and drop the same therefrom into the chute and thus empty the drum. This, of course, is the more feasible with those preparations and mixtures having a considerable tendency to flow when very hot. For those mixtures, however, that when cooked do not so readily flow, a door or gate $d^9$ such as shown on the rear head of the cylinder D' may be used. This, when opened, permits the contents of the cylinder to be discharged either by gravity or by the use of a suitable tool as preferred.

From the construction described the plant is obviously exceedingly compact and economizes to the utmost extent in heat inasmuch as the caldron, the drying compartment or compartments and the cooking cylinder are all within the furnace and exposed to the heat thereof in the most effective manner while it is obvious the operation having once begun no heat is lost for all the operations are performed under the influence of and in the presence of the heat from said furnace thus conserving the heat energy to the utmost extent.

Of course, in using the term bitumen or asphaltum I desire the term to be considered as broadly covering any plastic materials as tar, pitch or even crude petroleum or any material capable of use in such a plant as herewith described. I am aware the mixing mechanism may be used for mixing materials of any kind cold, if desired, and that details of the construction and the arrangement of parts may be varied and the peculiar movement of the material within the cylinder while cooking and mixing or when cold, may be accomplished in other ways than by the specified mechanism herein described or that mechanism for producing such movement may be omitted altogether, and the cylinder merely rotated upon its axis. I therefore do not purpose limiting this application for patent otherwise than necessitated by the prior art.

I claim as my invention:

1. In a machine of the class described, a movable closed mixing and cooking receptacle, mixing blades therein, means actuating the receptacle to impart oscillating movement to the contents, and a plurality of bins on each side of the receptacle and curved on the inner sides to afford a space between the same and receptacle.

2. In a machine of the class described an oscillating mixing and cooking chamber and rotatable means for delivering the materials to the mixing and cooking chamber adapted to mix a plurality of the materials together during delivery into the chamber.

3. In a machine of the class described, rotatable and oscillating mixing and cooking chambers, a caldron above and between said chambers and a coil between the cooking chambers adapted to deliver a heated spray into the caldron.

4. In a machine of the class described a cylindric approximately horizontally mounted and eccentrically journaled mixing and cooking drum, means rotating the same, means for delivering a plurality of different materials thereinto and means for actuating said delivering means to preliminarily mix the material together during delivery.

5. In a machine of the class described, a furnace, a mixing and cooking receptacle therein, mixing blades in the receptacle, means imparting motion to the receptacle to move the contents longitudinally and laterally and through the blades, vertical drying bins arranged longitudinally of the receptacle for drying material before delivery into the cooking receptacle and vertical flues between the vertical drying bins.

6. A machine of the class described embracing a source of heat, a rotatable and vertically oscillating substantially horizontal mixing and cooking chamber supported over said source, mechanism for actuating the same, a caldron, drying bins, a conveyer delivering the material to be treated into said chamber in a partly mixed condition, means for delivering the material from the caldron into the conveyer and means for delivering the material from the drying bins into the same conveyer.

7. In a device of the class described a source of heat, an eccentrically movable closed mixing and cooking receptacle supported approximately horizontally thereover, mixing blades rigidly secured centrally therein and extending to near the periphery of the receptacle, means actuating the receptacle, a feeder opening thereinto at one end of the axis of motion of the receptacle, means for discharging the contents of the receptacle at the opposite end and means for closing the discharge opening.

8. In a machine of the class described a substantially horizontal mixing and cooking cylinder, an eccentric head on each end thereof and on which the cylinder is eccentrically journaled, a feeder delivering into said cylinder through the axis of one head, means discharging the contents through the other head, rods extending from head to head at near the middle of the cylinder and mixing blades rigidly secured thereon and extending to near the inner periphery of the cylinder.

9. In a machine of the class described, a rotatable substantially horizontal mixing and cooking cylinder, a head eccentrically secured on each end thereof, whereby the cylinder is eccentrically journaled, a feeder delivering axially through one head, the other head having an axial aperture therethrough, radial blades or shelves extending from the head and shell to near said aperture and a chute adapted to be inserted into said aperture to receive the contents of the cylinder.

10. A portable asphalt machine embracing a furnace and trucks supporting the same, a normally closed mixing and cooking chamber supported to rotate and oscillate in the furnace, vertical drying bins forming the sides of the furnace, flues between the drying bins and mechanism for delivering the contents of the drying bins into the mixing and cooking chamber.

11. A portable asphalt machine embracing a truck frame, a furnace thereon, mixing and cooking cylinders supported horizontally on the frame to rotate and oscillate in the furnace, means above the cylinder for melting material and means exposed to the heat of the furnace for delivering air under pressure into the melting means.

12. A portable asphalt machine embracing a truck frame, a furnace thereon, a mixing and cooking cylinder supported horizontally to rotate and to oscillate vertically in the furnace, a feeder acting to deliver the material to be treated into the cylinder at the axis of rotation thereof, a caldron adapted to deliver into the feeder forming part of the top of the furnace, and drying bins adapted to deliver into the feeder forming the sides of the furnace and part of the top, and said caldron and bins exposed to the heat of the furnace.

13. A portable asphalt machine embracing a truck frame, a furnace thereon, a mixing and cooking cylinder journaled horizontally and eccentrically on the frame, in the furnace, means actuating the same, and means also supported in the furnace and affording the side of the furnace for heating and drying the materials to be treated in said cylinder.

14. An asphalt mixing and cooking machine embracing a frame mounted on truck wheels, a furnace thereon, a rotatable mixing and cooking cylinder exposed to the heat of the furnace, a closed force feed mechanism adapted to deliver the material to be treated into the cylinder, a plurality of valve controlled passages opening into the force feed mechanism, one passage for conducting melted material and the other passage for conducting granular material and means for rotating the cylinder.

15. An asphalt mixing and cooking machine embracing a frame mounted on truck wheels, a furnace thereon, an eccentrically movable mixing and cooking cylinder supported in the furnace, a force feed mechanism adapted to deliver the material to be treated in the cylinder at the axis of movement thereof, means actuating the cylinder, means melting the bitumen, means for drying the granular material preliminary to delivery of both into the feeder and independent mechanisms for delivering both the melted bitumen and granular material to the feeder.

16. An asphalt mixing and cooking machine embracing a portable mounted frame, a furnace thereon, a rotatable mixing and cooking cylinder journaled in the furnace, drying bins at one side thereof, a feeder adapted to deliver dried granular material from the bins together with bitumen into the cylinder in regulable quantities and means rotating the cylinder.

17. An asphalt mixing and cooking machine embracing a frame mounted on trucks, a furnace thereon, a rotatable substantially horizontal mixing and cooking cylinder for mixing bitumen and granular material together, a caldron supported on the furnace for melting the bitumen, one or more bins carried on the frame for drying granular material, a feeder adapted to deliver both the melted bitumen and dried material simultaneously into the cylinder, mixing means in the cylinder and means adapted to simultaneously actuate the feeder and the cylinder.

18. An asphalt mixing and cooking machine embracing a frame mounted on trucks, a furnace thereon, drying bins for granular material, a caldron for melting the bitumen and a mixing and cooking cylinder for mixing the granular material and bitumen together, said drying bins, caldron and cylinder exposed to the heat of the furnace and an inclosed feeder adapted to deliver both the granular material and bitumen into the cylinder in a heated condition and to partly mix the granular material and the bitumen together.

19. A machine of the class described embracing a frame, truck wheels supporting the same, a furnace carried on the frame, mixing and cooking drums supported in the furnace, means for heating and for drying the materials to be used, a regulable feeder delivering the prepared and partly mixed materials into the drums, mixing blades in said drums and means actuating the drums to move the material therein continually from end to end of the drums to bring the mixture therein into contact with all the inner surface thereof and means for discharging the contents of the drums.

20. A machine of the class described embracing a structural metal frame, truck wheels supporting the same, a furnace carried on the frame, bins for granular material, a melting caldron for bitumen, mixing and cooking drums supported in and exposed to the heat of the furnace, for mixing the granular material and the bitumen together, a positively actuated measuring and feeding mechanism adapted to deliver the granular material and bitumen together into the drum or drums, means eccentrically rotating each drum to bring the mixture therein into contact with all parts thereof and mixing blades in and movable with the drums.

21. A machine of the class described embracing a frame, truck wheels supporting the same, a furnace carried on the frame, drying bins therein, a caldron, mixing and cooking drums supported in the furnace, and rotatable to mix the bitumen and granular material together, a measuring and feed mechanism supplied from the caldron and bins and delivering the granular material and bitumen together into the drums, means actuating the drums to bring the mixture therein into contact with all parts thereof because of movement of the drum and mixing blades in and movable with each drum.

22. A machine of the class described embracing a structural metal frame, truck wheels supporting the same, a furnace carried on the frame, a caldron for melting bitumen, drying bins for the granular material, mixing and cooking drums supported in and exposed to the heat of the furnace, and adapted to mix the granular material and bitumen from the bins and caldron, closed end and side walls confining the heat thereto, means delivering the prepared materials together from the caldron and bins into the drums, mechanism for actuating the drums to bring the mixture therein into contact with all parts thereof and from end to end therein, mixing blades in and movable with the drums and means graduating the heat in the caldron.

23. In a machine of the class described the combination with a frame of truck wheels supporting the same, a furnace on the frame, cooking drums on the frame, for mixing bitumen and granular material together, walls inclosing the ends, sides and top of the drums, a caldron set in the top wall, and operative connections for delivering the contents thereof together with granular materials into the mixing drums.

24. In a machine of the class described the combination with a frame, of truck wheels supporting the same, a furnace on the frame, a mixing and cooking drum in the furnace, side, end and top walls inclosing the drum and confining the heat thereto, said walls comprising in part a caldron, drying bins for sand to be used, means for mixing the sand and bitumen together and delivering said materials into the drum and means in said drum for mixing the sand and bitumen together while cooking in the drum.

25. In a machine of the class described a frame, truck wheels supporting the frame, a furnace on the frame, mixing and cooking drums on the frame, end walls, side walls and a top wall inclosing the drums and confining the heat thereto, a caldron set in the top wall and jacketed from direct heat, bins forming a part of the remaining walls, a feeder delivering the sand and bitumen from the caldron and bins into the drums and mixing sand and bitumen together, means for rotating and oscillating the drums and mixing blades in each drum and rigidly secured thereto.

26. In a machine of the class described, a frame, truck wheels supporting the same, a furnace on the frame, an eccentrically mounted mixing and cooking drum, end walls, side walls, comprising bins having fire flues therebetween and a top formed in part by a caldron and inclosing the drum, a rotatable measuring feeder delivering the material hot from the caldron and bins into the drum at its axis of rotation, means for rotating the drum and mixing blades rigidly secured in the drum and acting to mix the materials during the movements thereof caused by the motion of the drum.

27. In a machine of the class described the combination with a frame, of a furnace suspended therefrom, an eccentrically mounted, rotatable drum supported above the furnace, rows of parallel drying bins for the granular material arranged along each side of the drum and partly over the drum and the bins of each row having fire flues therebetween and forming closed side walls and part of the top wall for the furnace, an elevated hopper, worm conveyers delivering said material after discharge from said bins into the hopper, a caldron supported on the bins and forming the remainder of the top wall, a feeder delivering the melted material from said caldron, and granular materials from the hopper in graduated amounts into the drum, mixing blades in said drum and movable therewith and means for actuating the drum and feeder.

28. In a machine of the class described a frame, a furnace suspended therefrom, an eccentrically mounted rotatable drum supported above the furnace, end walls, drying bins arranged alongside and partly over the drum and having fire flues therebetween and affording side walls and partial top walls above the drum, an elevated hopper, mechanism delivering said dried material from said bins into the hopper, an elevated caldron resting partly on the bins and closing the top wall, a jacket for said caldron, a measuring feeder delivering the material from said caldron and hopper in graduated amounts and partly mixed into the drum, mixing blades secured in and near the axis of each drum and movable therewith and means actuating the feeder and the drum.

29. In a machine of the class described, a frame, truck wheels supporting the same, a furnace suspended therefrom, an oscillating and rotatable horizontal drum supported above the furnace, drying bins arranged along each side and partly over the drum and having fire flues therebetween and affording tight side walls and part of a top wall, end walls connected with the side walls, an elevated hopper, mechanism delivering the dried material from the bottom of said bins into the hopper, an elevated and jacketed caldron closing the top wall and resting on the bins, a stack opening through the top, a feeder delivering melted asphaltum from said caldron, and granular material from the hopper in graduated amounts into the drum, mixing blades in the drum and movable therewith and means actuating the drum whereby the material is forced through the beaters to mix the same.

30. In a machine of the class described a frame, a furnace suspended therefrom, an eccentrically mounted rotatable drum supported above the furnace, drying bins for the granular material arranged along each side and partly over the drum and forming side and partial top walls therefor and having fire flues therebetween, each bin opening to the atmosphere, an elevated hopper, mechanism delivering the dried material from the bottom of said bins into the hopper, an elevated air jacketed caldron closing the top space between the bins, a feeder delivering the material from said caldron and the hopper in regulable amounts into the drum, and means operating the drum.

31. In a machine of the class described a frame, a furnace, suspended therefrom, a rotatable and oscillating drum supported above the furnace, drying bins for granular material arranged on each side of and extending over the drum, end walls through one of which an end of the drum projects, an elevated hopper, elevating mechanism delivering the dried material from the bottom of said bins into the hopper, an elevated air jacketed caldron also exposed to the heat of the furnace and together with the bins and end walls inclosing the drum, a rotatable measuring feeder delivering the material from said caldron and hopper in graduated amounts into the drum, mixing blades in each drum and movable therewith, means actuating the drum and means discharging the contents of the drum through said protruding end.

32. In a machine of the class described the combination with a frame, of a furnace thereon having a top and side and end walls, material drying bins open at the top to the atmosphere, comprising the side walls and part of the top and having fire flues therebetween, an elevated caldron forming the remainder of the top of the furnace, a rotatable and vertically and laterally oscillating mixing and cooking drum in said furnace and exposed except at its discharge end to the heat thereof, a feeder delivering the material from said caldron and dried material from the bins in graduated amounts into the drum, mixing means in the drum and means actuating the drum.

33. In a machine of the class described the combination with a frame, of a furnace thereon having side and end walls, open topped parallel drying bins affording the side walls and part of the top thereof, and each pair of bins having a flue therebetween, a caldron supported above the furnace and the drying bins and closing the top and having an inclined bottom and a casing surrounding said caldron to jacket the same.

34. In a machine of the class described a furnace, a caldron supported above and forming part of the top thereof, means regulably jacketing the caldron, a mixing and cooking receptacle in said furnace and below the caldron and at one end projecting from the furnace, a valved pipe adapted to deliver the contents of the caldron into said receptacle and means admitting another material also heated by the furnace in graduated amounts simultaneously therewith into said receptacle, said projecting part of the receptacle having a discharge aperture therein and means for moving said receptacle to incline its floor toward the discharge end.

35. In a machine of the class described a furnace, a caldron supported above the same and affording a part of the top thereof, a regulable fluid protecting the bottom and sides of the caldron, closely arranged drying bins having fire flues between and forming the sides and the arch of the top of the furnace, a mixing and cooking cylinder journaled eccentrically in the furnace with its discharge end projecting therefrom, means for actuating the same, a valved pipe connected to deliver the contents of the caldron into said cylinder and a power actuated feeder adapted to deliver dried material from said bins in graduated amounts simultaneously into said cylinder.

36. In a device of the class described a furnace, a jacketed caldron supported to form a part of the top thereof, elevated hoppers adapted to contain granulated material, mixing and cooking drums in the furnace, means imparting motion thereto to throw the contents thereof from end to end and from side to side, mixing blades rigidly secured in and movable with the drum or drums and a feeder adapted to deliver the material from said hoppers and from said caldron in graduated amounts and in partly mixed condition into said drum or drums.

37. In a device of the class described a furnace, a caldron forming part of the top thereof, elevated hoppers adapted to contain granulated material, means elevating such material thereinto, a mixing and cooking drum extending longitudinally in the furnace, means imparting motion thereto to throw the contents thereof from end to end and from side to side, mixing blades rigidly secured in the drum, a feeder adapted to deliver the material from said hoppers and from said caldron in graduated amounts and in partly mixed condition into said drum, one end of the drum extending through the furnace and having an aperture therein and means in the end of the drum for discharging the material through said aperture.

38. A device of the class described embracing a portable furnace, a caldron supported to afford a part of the top thereof, elevated hoppers adapted to contain granulated material, a screen above each, an elevator adapted to deliver granular material thereon and thence into the hoppers, a mixing and cooking drum extending longitudinally in the furnace and at its rear end projecting through the furnace, means imparting motion to throw the contents thereof from end to end and from side to side therein, mixing blades rigidly secured in and to the drum, a power operated feeder adapted to deliver the materials from said hoppers and from said caldron in graduated amounts and in partly mixed condition into said drum, and means for discharging the contents from the protruding end of the drum.

39. In a device of the class described a furnace, wheels supporting the same, drying bins affording the sides thereof, a valve in the bottom of each bin, a conveyer to receive the material therefrom, a hopper, an elevator delivering the material from the conveyer to the hopper, a caldron for melting plastic material and forming a part of the top of the furnace, a rotatable mixing and cooking cylinder in the furnace and a feeder communicating therein at the axis of rotation and delivering material from the caldron and the hopper thereinto.

40. A device of the class described comprising a furnace, drying bins forming the side walls and part of the top thereof and spaced apart to afford fire flues therebetween, a caldron for melting plastic material closing the top of the furnace between the bins, elevated hoppers, mechanism delivering the dried material to the hoppers, an eccentrically movable mixing and cooking receptacle in the furnace, means delivering material from the caldron and the hopper thereinto, mixing blades supported along the axis of the receptacle and acting to mix the contents during cooking.

41. A device of the class described embracing a furnace, vertical heads having inwardly directed, eccentric flanges and an outwardly directed concentric flange on one head, a cylinder rigidly secured at its ends to the eccentric flanges, anti-friction rollers on which the concentric flange bears to support the cylinder, means for rotating the cylinder, and an automatic feeder delivering into the cylinder through one of the journals therefor.

42. In a device of the class described a furnace, a plurality of eccentrically journaled mixing and cooking cylinders horizontally extended therein, means for rotating said cylinders, an automatic feeder for each cylinder delivering into the same at the axis of rotation thereof, bins for drying granular material, screens adapted to receive the dried granular material prior to delivery to the feeder, an elevator for the granular material and a chute adapted to conduct the granular material from the elevator to the screens or to the bins.

43. In a device of the class described a melting, drying, mixing and cooking furnace embracing a firepot, a plurality of bins having fire flues therebetween and affording the side walls and a part of the top of the furnace, end walls, a longitudinally extended caldron inclosing the top of the furnace, an elevated hopper, elevating mechanism delivering the dried material from the bottom of the bins into the hopper, a mixing and cooking receptacle inclosed within the furnace and projecting through one end thereof, mechanism for delivering the material from the hopper and the caldron simultaneously into said receptacle, means actuating said receptacle vertically and laterally to facilitate mixing and cooking the contents, said portion of said receptacle protruding from the end wall having a discharge aperture therein.

44. A melting, drying and mixing and cooking furnace of the class described embracing a firepot, a plurality of open topped bins having fire flues therebetween and valved bottoms and affording the side walls and a part of the top of the furnace, end walls, a longitudinally extended caldron closing the top of the furnace, a stack for the furnace, an elevated hopper, mechanism delivering the dried material from the bottom of the bin into the hopper, a rotatable mixing and cooking cylinder closed within the furnace with its axis arranged obliquely with and intersecting the axis of its rotation at the middle of the cylinder, mechanism for delivering the material from the hopper and from the caldron into said cylinder at an end of the axis of rotation, mixing blades in the cylinder to facilitate mixing and cooking the contents and means automatically discharging the contents of the cylinder.

45. In a portable machine of the class described the combination with a melting caldron for the bitumen of drying bins for granular material, mixing and cooking means for the aforesaid materials all exposed to the heat of a single furnace, and means connected to receive material from the melting caldron and connected to receive material from the drying bins and deliver both together into the mixing and cooking means.

46. A machine of the class described comprising a melting caldron for bitumen, drying bins for the granular material and a mixing and cooking receptacle all forming a part of, and heated by the same furnace, means oscillating the receptacle to facilitate heating and mixing, and rotatable means adapted to receive melted bitumen from the caldron and dried granular material from the bins and to deliver both together into the mixing and cooking receptacle.

47. A portable machine of the class described embracing a melting caldron for bitumen and drying bins for granular material all affording part of a single furnace, mixing and cooking means within the furnace, movable screens, elevating and conveying mechanisms adapted to deliver the material from the drying bins to the screens, a hopper beneath each screen to receive the material of requisite fineness therefrom, chutes delivering coarser material therefrom and a feeder delivering the melted and the dried material into the mixing and cooking means.

48. A portable furnace of the class described embracing a frame mounted on truck wheels, a plurality of independently constructed drying bins having fire flues therebetween and forming the side walls and top of the furnace, a valved bottom for each bin, screens and conveying and elevating mechanisms delivering the material from the bins to the screens to graduate the same as to fineness.

49. A portable furnace of the class described embracing a frame mounted on truck wheels and carrying a firepot, closed side and end walls, the former comprising a plurality of independently constructed drying bins affording flues therebetween and forming part of the top of the furnace, a valved bottom for each bin, conveying and elevating mechanism adapted to deliver the material from the bins to the screens to grade the same as to fineness and a cooking receptacle in the furnace between the bins.

50. A device of the class described comprising a portable furnace, closed side and end walls and a top therefor, part of which are formed by melting and drying receptacles, a cooking receptacle in the furnace and means oscillating the same to assist in mixing the contents thereof.

51. A furnace mounted on truck wheels, closed side and end walls, the former of which consist of a plurality of independently constructed drying bins also forming part of the top of the furnace and affording flues therebetween, a valved bottom for each bin, a melting receptacle closing the top of the furnace, an inclined rotatable screen and conveying and elevating mechanisms delivering the contents of the bins thereto, a cooking and mixing chamber in the furnace, and means delivering the material from the screen and the caldron thereinto.

52. In a device of the class described the combination in a furnace of side walls comprising inwardly arching drying bins of a caldron supported thereon and completing the arch of the furnace top and comprising an inner and outer shell affording an air jacket therebetween, the outer of said casings having apertures in the top thereof and removable covers for said apertures whereby the heat imparted to the caldron may be regulated.

53. A device of the class described comprising a portable furnace, drying bins forming the side walls and arched to afford part of the top, a caldron supported on and completing the arched top and comprising an inner and an outer shell affording a jacket therebetween, a mixing and cooking receptacle in the furnace, means supplying the same with material from the caldron and bins, and means agitating the same.

54. In a device of the class described the combination with a furnace, of a mixing and cooking receptacle therein, a feeder delivering thereinto embracing a rotatable valve closure having pockets therein, a hopper at the bottom of which said valve closure is journaled to control the discharge aperture therefrom, means for rotating said closure, a conveyer forcing said material into said receptacle and a valved pipe connected to deliver melted asphalt into said conveyer.

55. A machine of the class described embracing a furnace, a drying receptacle forming each side of the furnace and subdivided into a plurality of independent compartments, a mixing and cooking receptacle in the furnace between the drying receptacles and mechanism acting to deliver the dried material into the latter receptacle, one of said receptacles being movable.

56. In a machine of the class described a furnace, a drying receptacle, a melting receptacle, a cooking receptacle, all of said receptacles extending into the furnace and positively driven mechanism connected to deliver the materials from the first two receptacles into the last named receptacle.

57. In a device of the class described the combination with a furnace, of a mixing and cooking receptacle therein, a feeder embracing a rotatable valve closure having pockets therein, a hopper at the bottom of which said valve closure is journaled to control the discharge aperture therefrom, means for rotating said closure, a conveyer adapted to receive granular material from the said closure and pass the same into the cooking receptacle, and a valved pipe delivering asphalt into said conveyer on said material.

58. In a device of the class described the combination with a furnace, of a drying, a melting and a mixing and cooking receptacle all exposed to the heat thereof, a feeder embracing a rotatable valve closure having pockets therein, a hopper connected to receive material from the drying receptacle and at the bottom of which said valve closure is journaled to control the discharge aperture therefrom, means for rotating said closure, a conveyer adapted to receive granular material from the said closure, and pass the same into the cooking receptacle and a valved pipe delivering asphalt from the melting receptacle into said conveyer.

59. In an apparatus of the kind specified, a centrally disposed furnace, a heating chamber above the same through which the products of combustion pass from said furnace to the stack, said bins disposed on opposite sides of said heating chamber, the inner walls of said bins converging and extending over said heating chamber, asphalt containing means disposed in the upper portion of said heating chamber between the converging ends of said bins, the asphalt containing means being supported between said converging ends, mixing drums disposed within said heating chamber and having valve controlled communication with said asphalt containing means, and sand transporting means adapted to convey sand from said bins to said mixing drums.

60. In an apparatus of the kind specified a centrally disposed furnace, a heating chamber above the same through which the products of combustion pass from said furnace to the stack, sand bins disposed on opposite sides of said heating chamber, the inner walls of said bins converging and extending over said heating chamber, asphalt containing means disposed in the upper portion of said heating chamber between the converging ends of said bins, mixing drums disposed within said heating chamber and having valve controlled communication with said asphalt containing means, sand transporting means adapted to convey sand from said bins to said mixing drums and rotary sifting means interposed in the sand transporting means.

61. A device of the class described comprising a portable furnace, closed side and end walls and a top therefor, melting receptacles and drying receptacles forming part of said walls, a cooking receptacle in the furnace, means for delivering the contents of the melting and drying receptacles to the cooking receptacle, and means oscillating the latter to assist in mixing the contents thereof.

62. In a device of the class described, a furnace, a plurality of eccentrically journaled mixing and cooking cylinders horizontally extended therein, an automatic feeder for each cylinder delivering into the same at the axis of rotation thereof, bins for drying granular material, screening means adapted to receive the dried granular material prior to delivery to the feeder, an elevator for the granular material and a chute adapted to conduct the granular material from the elevator to the screens or to the bins.

In testimony whereof I have hereunto subscribed my name in the presence of two subscribing witnesses.

CHARLES E. GUELICH.

Witnesses:
C. W. HILLS,
CHESTER T. DRAKE.

Copies of this patent may be obtained for five cents each, by addressing the "Commissioner of Patents, Washington, D. C."